(12) United States Patent
Johnson et al.

(10) Patent No.: US 9,483,084 B2
(45) Date of Patent: Nov. 1, 2016

(54) FRICTIONAL HINGE FOR ELECTRONIC DEVICES

(71) Applicant: Intel Corporation, Santa Clara, CA (US)

(72) Inventors: Patrick S. Johnson, Olympia, WA (US); Russell S. Aoki, Tacoma, WA (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 14/038,913

(22) Filed: Sep. 27, 2013

(65) Prior Publication Data

US 2015/0092335 A1    Apr. 2, 2015

(51) Int. Cl.
    *E05D 11/08* (2006.01)
    *G06F 1/16* (2006.01)

(52) U.S. Cl.
    CPC .......... *G06F 1/1681* (2013.01); *Y10T 16/5403* (2015.01)

(58) Field of Classification Search
    CPC ........... Y10T 16/54038; G06F 1/1681; G06F 1/1616; E05Y 2900/606; E05Y 2201/49; E05D 11/082; E05D 11/084; E05D 11/085; H04M 1/0216
    See application file for complete search history.

(56) References Cited

U.S. PATENT DOCUMENTS

| | | | | |
|---|---|---|---|---|
| 5,010,983 A | * | 4/1991 | Kitamura | 188/67 |
| 5,037,231 A | * | 8/1991 | Kitamura | 403/120 |
| 5,173,837 A | * | 12/1992 | Blackwell et al. | 361/679.28 |
| 5,195,213 A | * | 3/1993 | Ohgami et al. | 16/342 |
| 5,197,704 A | * | 3/1993 | Kitamura | 248/292.11 |
| 5,231,734 A | * | 8/1993 | Rude | 16/342 |
| 5,354,028 A | * | 10/1994 | Kitamura | 248/292.11 |
| 5,464,083 A | * | 11/1995 | Arnold et al. | 192/223.4 |
| 5,542,505 A | * | 8/1996 | Kempf | 188/77 W |
| 5,564,163 A | * | 10/1996 | Lowry et al. | 16/342 |
| 5,749,124 A | * | 5/1998 | Lu | 16/307 |
| 5,771,539 A | * | 6/1998 | Wahlstedt et al. | 16/285 |
| 6,779,234 B1 | | 8/2004 | Lu et al. | |

(Continued)

FOREIGN PATENT DOCUMENTS

| | | |
|---|---|---|
| TW | 582578 U | 4/2004 |
| TW | M315362 U | 7/2007 |

OTHER PUBLICATIONS

Leone et. al. "Getting up to speed with wrap-spring clutch/brakes No-slip clutch/brakes keep loads and frives synced up" Machine Design, Jan. 25, 2007, 5 pages.

(Continued)

*Primary Examiner* — Chuck Mah
(74) *Attorney, Agent, or Firm* — Jordan IP Law, LLC (57) ABSTRACT

A frictional hinge assembly for use with electronics devices such as computer notebooks having base and lid portions may present a higher level of frictional resistance to rotation in one direction than in the other. The hinge may comprise a base-mounted helical sleeve having loops that embrace a rotational shaft that is connected to a lid. As the lid is opened, the rotation of the shaft may cause the loops of the helical sleeve to tighten and thereby generate frictional forces, which requires a greater opening force to overcome than when the lid is being closed, in which case the loops loosen. The helical hinge may have applicability for notebook computers, electronic devices having clamshell form factors, all-in-one designs and tablets using kickstands and the like.

14 Claims, 9 Drawing Sheets

(56) References Cited

U.S. PATENT DOCUMENTS

| | | |
|---|---|---|
| 7,043,797 B2 * | 5/2006 | Cau .................................. 16/285 |
| 8,091,178 B2 | 1/2012 | Degner et al. |
| 2004/0049883 A1 * | 3/2004 | Huang ............................ 16/295 |
| 2004/0198412 A1 * | 10/2004 | Pontoppidan et al. ..... 455/550.1 |
| 2006/0048337 A1 * | 3/2006 | Lowry et al. ................... 16/342 |
| 2007/0039131 A1 | 2/2007 | Rude |
| 2010/0088853 A1 * | 4/2010 | Degner et al. .................. 16/342 |
| 2010/0142131 A1 | 6/2010 | Tang |
| 2010/0281653 A1 | 11/2010 | Lin |
| 2012/0204380 A1 * | 8/2012 | Chen ............................... 16/342 |

OTHER PUBLICATIONS

International Search Report and Written Opinion for Patent Application No. PCT/US2014/057639, dated Jan. 9, 2015, 17 pages.
International Preliminary Report on Patentability and Written Opinion received for PCT Patent Application No. PCT/US2014/057639, mailed on Apr. 7, 2016, 13 pages.

* cited by examiner

FRICTIONAL HINGE FOR ELECTRONIC DEVICES

TECHNICAL FIELD

Embodiments described herein generally relate to a hinge mechanism having particular use with mobile computers, smart phones, tablets, adaptive all-in-one desktop computers and other electronic devices having angularly displaceable elements. More particularly, embodiments relating to frictional hinges for use with clamshell form factors, notebook computers and related configurations.

BACKGROUND

Notebook computers, convertible computers that can serve both as desktop and notebooks, notebooks and tablets having interconvertability, combinations thereof, and clamshell-style electronics of all kinds typically may have screens that are hinged to a base portion. In one configuration, the unit may be closed and in another (the "in-use" configuration for notebooks) it may be open. Moreover, it may be desirable that the amount of torque necessary to open the device be less than what is required to close it. For example, given patterns of usage, it may be ergonomically better for a notebook to be openable (i.e., its screen raised), with lesser forces or torque than are required to close it because the user would not want to accidentally close a device that is in use.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
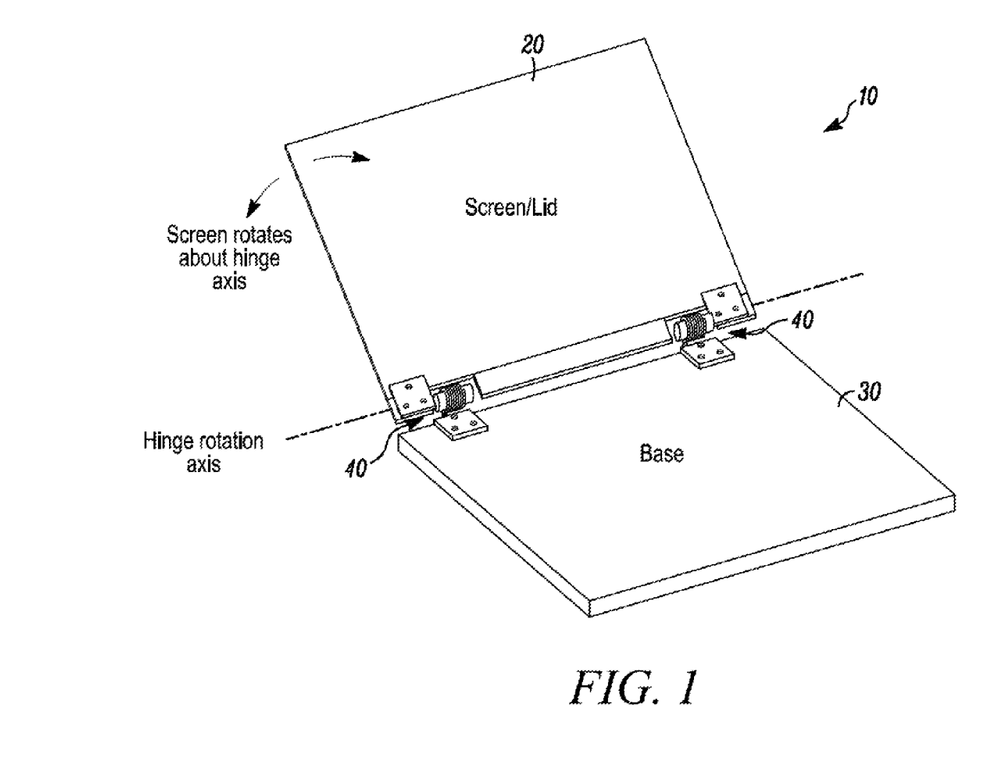
FIG. 1 is a perspective view of an example of a computer notebook having two hinges constructed according to the principles set forth herein.

Computer notebooks, personal electronics such as smart phones having clamshell form factors and convertible computer tablets and all-in-one systems may generally present parts that pivot with respect to one another. Hinge mechanisms to accomplish this pivoting are set forth herein. As is shown in FIG. 1, a notebook 10 has a lid 20 connected to a base 30 via a pair of hinges 40 constructed according to the principles described in further detail below. It is often desirable that the opening force required of the user, such as to pry the lid 20 off the base 30, be less than the force needed to close it. This arrangement allows a low hinge force for easy opening of the device, while also allowing a high hinge force such as may prevent accidental closing of the lid when the device is in use. In other hardware, such as a kickstand used with a tablet, it may be desirable for the moveable parts to require greater torques when opening than in closing in order to help counter the effects of gravity on the hinge. This arrangement may require a hinge that presents higher resistance—typically frictional in origin—in one direction than in the other. Embodiments of such a hinge are presented herein.

Figure 2:
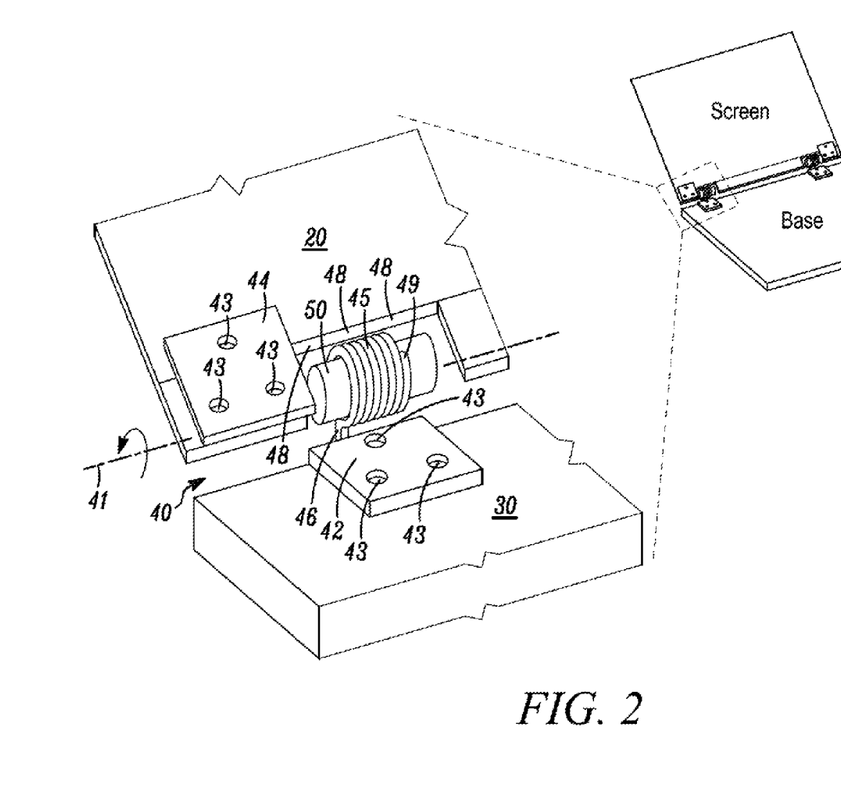
FIG. 2 is a schematic and partially exploded view of an example of a hinge constructed according to one embodiment as set forth herein.

Turning now to FIG. 2, a hinge 40 constructed according to the principles of a first embodiment is shown. A first hinge bracket 42 may be attached via screws or other known means (holes 43 for accommodating screws are shown) to the base portion 30. Offset from the illustrated hinge bracket 42 is a hinge rotation axis 41. Attached to the illustrated hinge bracket 42 is a helical compressive sleeve 45 having a first end 46 that is securely connected to the hinge bracket 42. The helical sleeve 45 may also have a free end 49. The helical sleeve 45 may be made up of a number of turns or loops 48, and may be constructed of spring steel or any other material known to designers for constructing such parts. Attached to the illustrated lid 20 is a second hinge bracket 44, to which is attached a solid shaft 50 whose rotational center coincides with the hinge rotation axis 41. The shaft 50 may be sized with respect to the loops 48 of the helical sleeve 45 so that with at least with respect to the loop or loops nearest the free end 49, there is an interference fit between the inner diameter of the helical sleeve 45 and the outer diameter of the shaft 50 when the latter is inserted into the former.

Figure 3A:
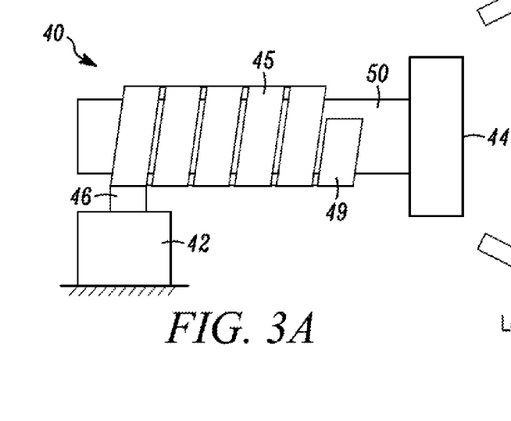
FIG. 3A is a schematic side view of an example of the first embodiment of a hinge.
Figure 3B:
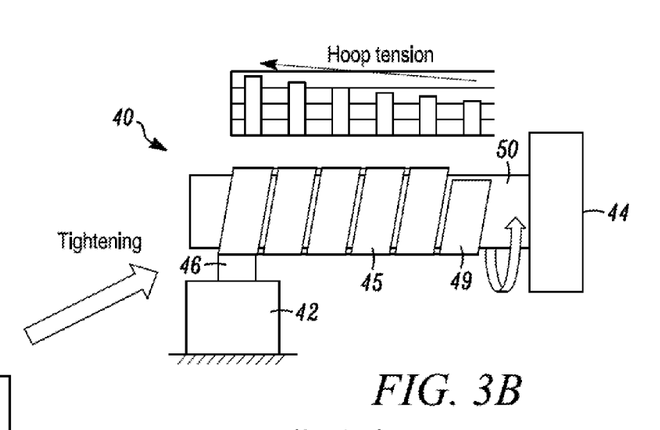
FIG. 3B illustrates an example of the hinge shown in FIG. 3A undergoing a tightening rotation.
Figure 3C:
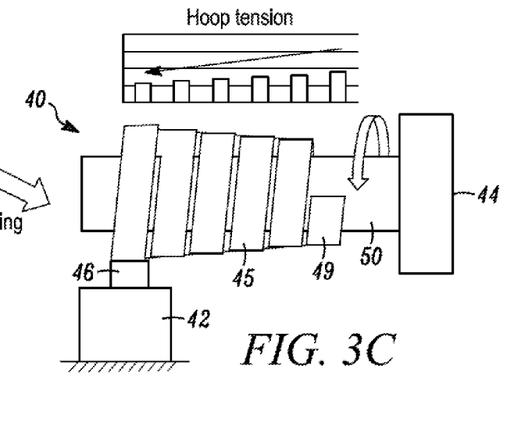
FIG. 3C illustrates an example of the hinge shown in FIG. 3A in a loosened state.

The use of a helical sleeve 45 as part of the hinge 40 (FIG. 3A) may generate a first, relatively high level of friction when rotating in one direction (FIG. 3B), but a substantially lower level of friction when rotating in the other direction (FIG. 3C). As is illustrated in FIG. 3B, the helical sleeve 45 may self-tighten creating higher friction when the hinge shaft 50 rotates in the one direction (tightening—FIG. 3B), and may similarly allow it to self-loosen creating lower friction when the hinge shaft rotates in the opposite direction (loosening—FIG. 3C). The length of the helix (the number of windings or loops 48) may substantially determine the relative ratio between the tightening and loosening friction levels. Hinges with high ratios of tightening-to-loosening friction may be helpful in meeting the mechanical design requirements for the adaptive "All-In-One" (AAIO) designs and those that employ kickstands for support.

The illustrated helical sleeve 45 is composed of a series of loops 48 that are available to be wrapped around the shaft 50. Whereas the end 46 of the helical sleeve 45 may be anchored to the hinge bracket 42, the end 49 may be free in the limited sense that it is frictionally engaged via an interference fit with respect to the hinge shaft 50. When the shaft 50 and brackets are rotated with respect to one another, the free end 49 of the illustrated helical sleeve 45 is slidingly dragged along the surface of the hinge shaft 50, which causes the loops 48 to tension.

As the hinge is rotated in a tightening motion, each loop in the helical sleeve may get wrapped tighter due to the force of its own friction. However, in addition to its own friction, each successive loop may pull on the loop upstream from it (towards the hinge bracket 42), which serves to wrap the upstream loop even tighter, thereby increasing compression (and friction) against the hinge shaft 50. That successive tightening builds through each successive loop right to left (as shown in FIG. 3B), allowing the hinge to achieve very high levels of tightening friction over the first few degrees of angular motion, after which the level of tightening reaches a plateau. Likewise, as the illustrated hinge 40 is rotated in a loosening motion, the friction works in the opposite direction, causing the loops to unwrap and thereby reducing compression (and friction) against the hinge shaft 50. Even then, however, the free end 49 remains in contact with the shaft 50. Here, each successive loop acts on its upstream neighbor causing it to unwrap further, giving it the tapered profile shown in exaggerated form in FIG. 3C. In this way, the loosening frictional force may become very low. The hoop tensions that arise in the loops are shown in profile in FIGS. 3B (tightening) and 3C (loosening).

Figure 4:
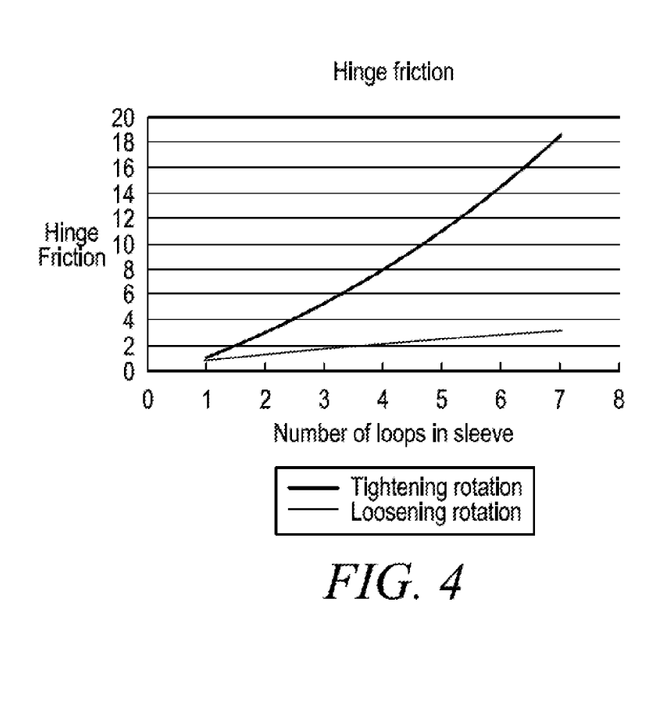
FIG. 4 is a graph of an example of hinge friction as a function of the number of loops.
Figure 5:
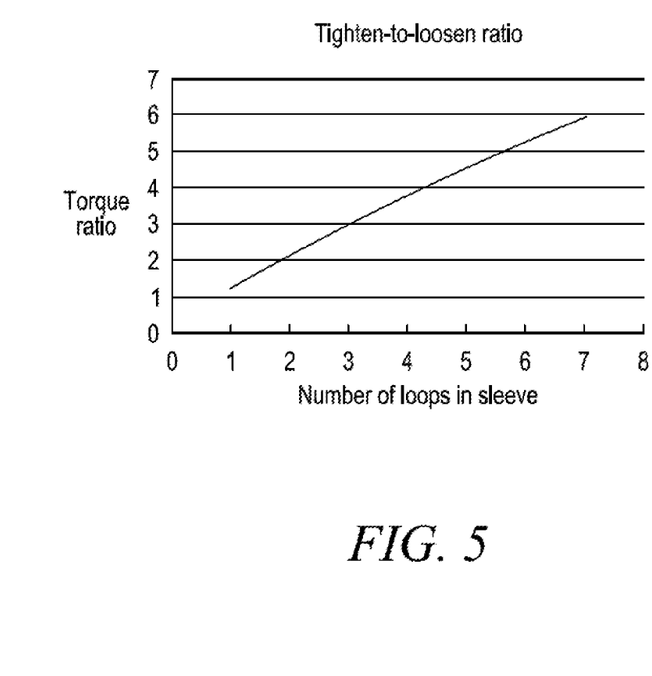
FIG. 5 is a graph of an example of the tightening-to-loosening ratio of the first embodiment.

The ratio of tightening-to-loosening friction can be tailored based on the design characteristics of the helix. The greater the number of loops 48 designed into the helical sleeve 45, the greater the effect of the successive tightening and loosening, and thus, higher levels of friction can be achieved (see FIG. 4) and Tighten-to-Loosen ratios as well (FIG. 5). Other parameters affecting the frictional levels and their ratios may include the material selection (e.g. selection of a particular steel), material thickness, shaft diameter, helix width, and diametric interference. Each of these factors may influence the tightening and loosening friction.

Figure 6:
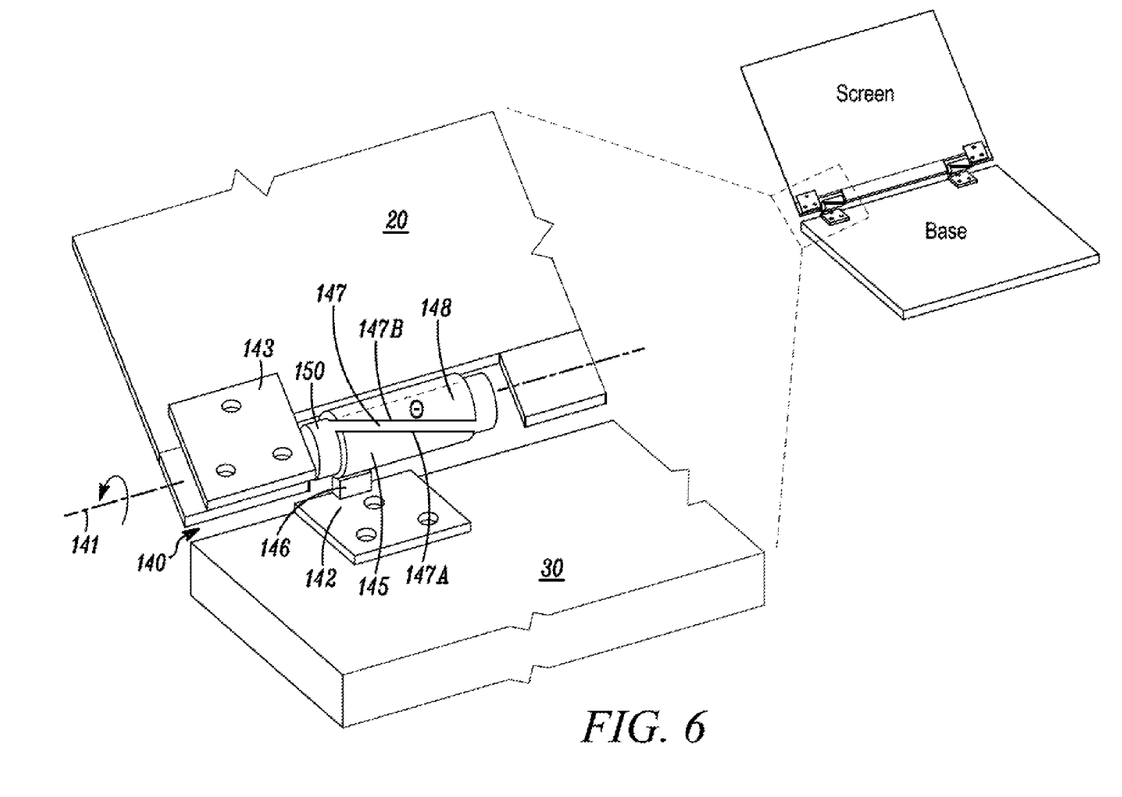
FIG. 6 is a schematic and partially exploded view of an example of a hinge constructed according to a second embodiment.

FIG. 6 presents an additional embodiment of a hinge, generally indicated at 140. Here, instead of a multiloop sleeve, an approximately cylindrical helical compression sleeve 145 is provided, with one end 146 attached to a hinge bracket 142 and the other end 148 being free. The helical compression sleeve 145 has a helical slit 147 cut along its length defining two edges 147a and 147b that are circumferentially displaceable with respect to one another. The slit, as it would appear with the sleeve laid flat, may be linear or it can have a curvilinear shape. Inserted into the illustrated helical compression sleeve 145 is a shaft 150, which may be attached to a bracket 143. The fit between the helical compressive sleeve 145 and the shaft 150 may be compressive, particularly at the free end 148, so that when the shaft rotates about hinge axis 141, the free end 148 slidingly drags along with the shaft 150.

The illustrated embodiment uses a helix angle θ of approximately 20 degrees. This angle can be varied to provide for differing performance characteristics. Even at this fairly shallow angle, the orientation of the slit increases the ratio of tightening-to-loosening friction. One advantage of this embodiment is that it may provide consistent wear and reliability through the life of the hinge. Another advantage is that it may be relatively simple to manufacture. For example, a rectangular piece of sheet metal can be given linear cuts at an angle θ along two of its parallel edges and then rolled into a generally cylindrical shape for use as a compression sleeve. Alternatively, a section of a cylinder can be cut along an angle θ to produce the compression sleeve.

The helical sleeve hinge can be used in clamshell notebook systems to allow a very easy lid-opening rotation, while still generating good resistance during lid closing. Human behavior may tend to lead users to open the lid gently, but close it more forcefully. The designs presented here can be crafted to mirror that human tendency in the hinge, having a lighter opening resistance, and higher closing resistance. In addition, contemporary notebook computers may be increasingly lighter in weight. This may be beneficial, as consumers prefer light weight devices. One drawback, however, is that the base may not be heavy enough to stay in place during lid opening; the base then rotates upward along with the lid due to hinge friction. The ability to reduce the hinge friction for the opening direction may enable even lightweight bases to stay in place during lid opening, while the differential with respect to closing prevents the lid from closing when that is not desired.

Figure 7:
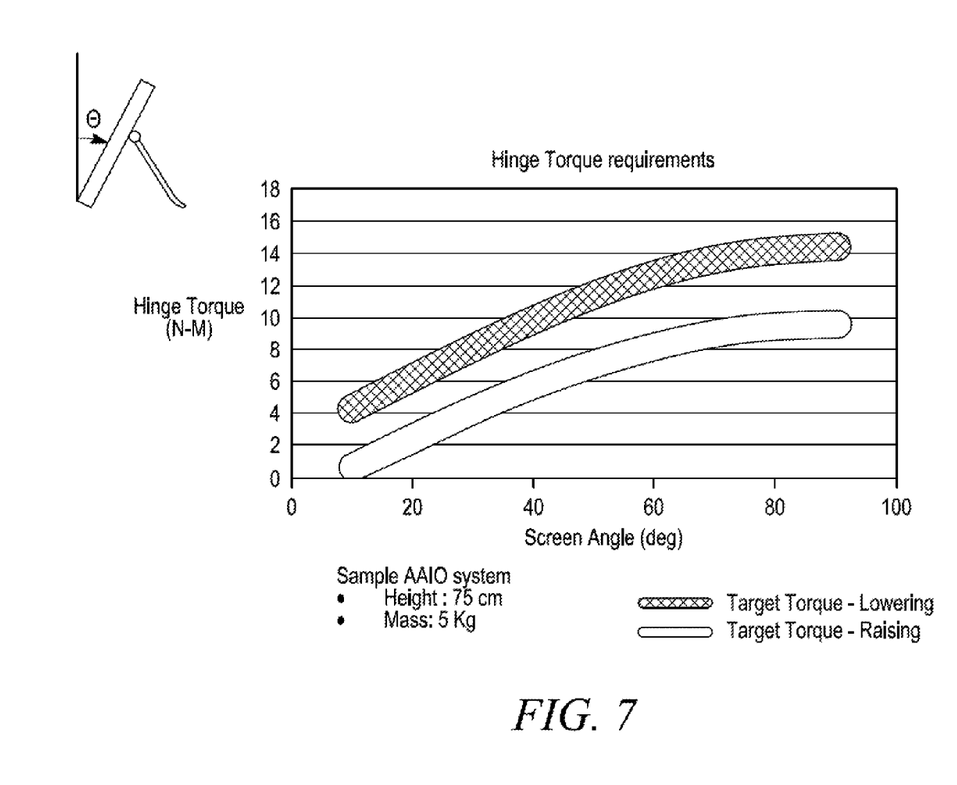
FIG. 7 is a graph of an example of the torque requirements of a hinge used in an adaptive all-in-one system such as is described herein.

The hinge mechanisms disclosed here can also be used in convertible notebook systems requiring more complex kinematics. There are several known conversion mechanisms available that allow a notebook to convert to a tablet. Such conversion mechanisms typically include a hinge of some type, and many of those mechanisms can benefit from the ability to tailor the hinge friction separately in each direction of rotation. In the case of an adaptive all-in-one system, the hinge torque requirements are may be biased in one direction due to the gravitational load on the system. (This may also be true for notebooks, but the lid mass is much lower for notebooks, and therefore, not the driving factor in hinge design). As a result of this gravitational bias, the desired hinge friction during a lowering motion may be greater than the desired friction during a raising motion. Plots presenting an example of the resultant hinge torque desired for the lowering and raising motions of one sort of system are shown in FIG. 7.

Figure 8:
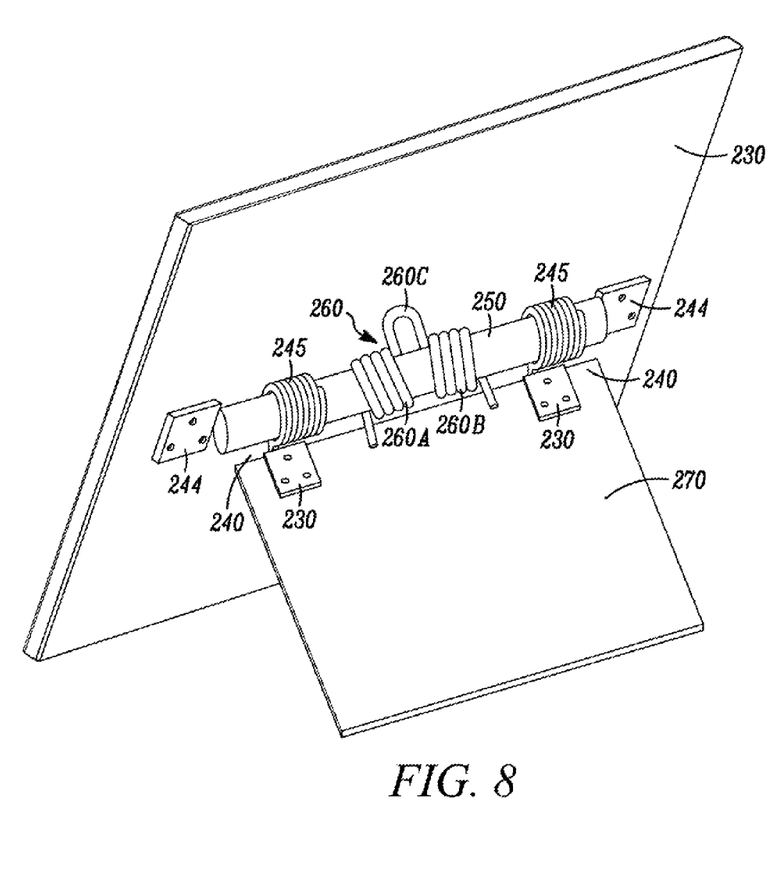
FIG. 8 is a perspective view of an example of a third embodiment of the hinge, used to support a kick stand for an all-in-one system.

The embodiment shown in FIG. 8 can be adapted to meet these torque requirements as well providing a design that offers additional ways of tailoring the hinge to the operational requirements at hand. Here, an all-in-one device 230, which may also be a computer tablet, is provided with a kick stand 270. Two hinges 240 may be mounted to the device 230 as follows. First, a pair of brackets 244, which bound and fix in place a shaft 250, are mounted to the device 230. In the manner of the embodiment of FIG. 2, a pair of helical sleeves 245 overly the shaft 250 with a frictional fit at one end and are each secured to a bracket 230 at the other end. The illustrated brackets 230 are secured to a kick stand 270. Interposed midway along the shaft 250 between the two helical sleeves 245 is a torsion spring 260 that loosely fits around the shaft 250. The particular torsion spring shown has a bilateral construction with sides 260A and 260B matching one another and are connected via a U-shaped region 260C that also presses against the device 230. Other torsion springs, however, may be employed. Also, cylindrical compression sleeves such as that shown in the embodiment of FIG. 6 may be used in place of helical sleeves 245.

Figure 9:
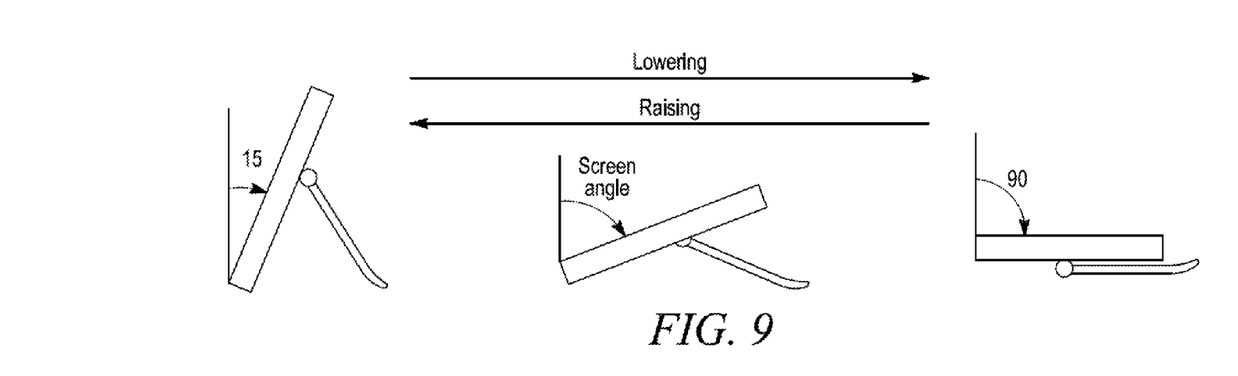
FIG. 9 shows an example of the hinge of FIG. 8 in various angles of use.

FIG. 9 shows several orientations for which this arrangement can be used.

Figure 10A:
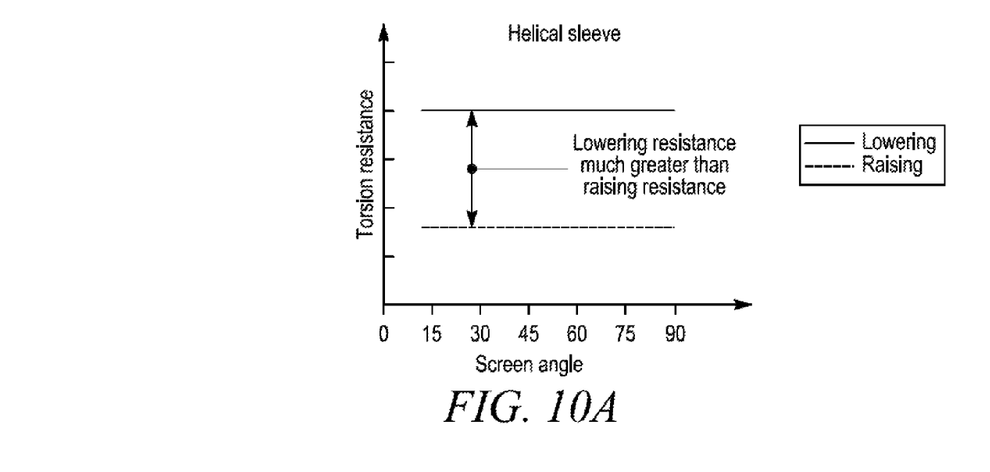
FIGS. 10A, 10B, and 10C present graphs of examples of various measures of torsion resistance as a function of screen angle for the embodiment of FIG. 8.
Figure 10B:
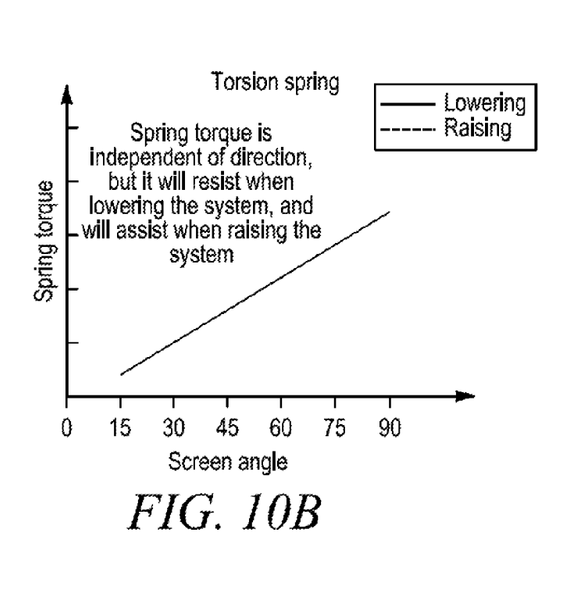
Figure 10C:
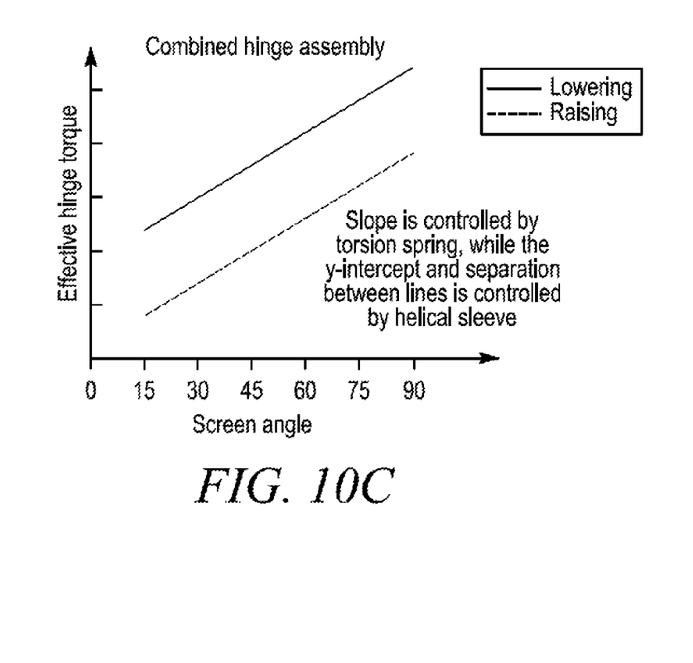

The hinge may provide a constant level of friction independent of screen angle (see FIG. 10A), while the torsion spring may provide an increasing level of resistance proportional to the screen angle (FIG. 10B). The torsion response of both elements together is shown in FIG. 10C. The slope of the curves can be selected using the mechanical properties of the torsion spring element. The offset between the two curves can be tailored by modifying the hinge.

Additional Notes and Examples

Example one may include a portable computing device that includes a first portion such as a display housing and a second portion pivotally attached to the first portion. A hinge assembly connecting these two portions permits their pivoting movement relative to one another. That hinge assembly has a first mounting bracket and a second mounting bracket, a helical sleeve having a first end and a second end, the first end being connected to the first mounting bracket. It also has a cylindrical shaft having a diameter and first and second ends and being connected at one of those ends to the second mounting bracket. The helical sleeve has a diameter such that when the helical sleeve is mounted onto the shaft, there is an interference fit between the second end of the sleeve and the shaft.

Additionally, the second portion of the portable computing device of example two can include a kickstand. The portable computing device can be a notebook computer, a tablet computer, or a smart phone or other electronics device having a clamshell form factor.

Example two may include a hinge assembly for permitting the pivoting movement of first and second portions of an electronic device such as a notebook computer or a tablet having a kickstand. In this example, the hinge assembly includes first and second mounting brackets and a helical sleeve, one end of which is connected to the first mounting bracket. A cylindrical shaft having an outer diameter is connected at one of its ends to the second mounting bracket and the other of its ends is inserted into the helical sleeve. The helical sleeve has an inner diameter such that when the helical sleeve is mounted onto the shaft, the outer diameter of the shaft and the inner diameter of the helical sleeve provide an interference fit between the free end of the sleeve and the shaft.

Additionally, the helical sleeve may be composed of one or more loops arranged in a helix. In addition, these loops may be sized with respect to the diameter of the shaft so that when the shaft rotates in a first direction, the loops progressively tighten about the shaft resulting in increasing frictional forces with respect to the shaft, and when the shaft rotates in the opposite direction, the loops progressively loosen about the shaft resulting in a lessening of the frictional forces with respect to the shaft. The tightening of the loops becomes progressively tighter in the direction of the end of the helical sleeve that is attached to the first mounting bracket. On the other hand during loosening, the loops become progressively looser in the direction of the end of the helical sleeve opposite the first mounting bracket. In addition the hinge presents a tightening torque and a loosening torque such that the tightening torque is greater than the loosening torque.

Example three may provide a hinge assembly for permitting the pivoting movement of a first portion of an electronics device with respect to a second portion of an electronic device, comprising a first mounting bracket and a second mounting bracket; a generally cylindrical sleeve having a first end and a second end such that the first end is connected to the first mounting bracket. The sleeve has two axially extending edges that are circumferentially spaced apart from one another defining a helix. The hinge has a cylindrical shaft having first and second ends that is connected at one of those ends to the second mounting bracket. The cylindrical sleeve has a diameter such that when the helical sleeve is mounted onto the shaft, there is an interference fit between the second end of the sleeve and the shaft.

Additionally, in example three the sleeve may be sized with respect to the diameter of the shaft so that when the shaft rotates in a first direction, the sleeve progressively tightens about the shaft resulting in increasing frictional forces with respect to the shaft, and when the shaft rotates in the opposite direction, the sleeve progressively loosens about the shaft resulting in a lessening of the frictional forces with respect to the shaft. During tightening there is an interference fit between the sleeve and the shaft that becomes progressively tighter in the direction of the first end of the sleeve. Additionally, the hinge assembly of example three may present a first level of torque while being turned in one direction and a second level of torque while being turned in a second direction. Also, the hinge assembly may be connected to a computer notebook having a base portion and a lid. This hinge assembly may also be used to connect a kickstand to a computer tablet.

Example four may include two hinges of any of the embodiments set forth here arrayed on opposite ends of a common shaft. A torsional spring is mounted onto the shaft so as to urge apart the first and second portions of the electronics device, which may be an all-in-one design or a tablet or a clamshell. It may be that one of the portions of the electronics device is a kick stand.

Example five is a method for providing varying degrees of frictional resistance against the opening and closing of a hinge used for electronics device having angularly displaceable parts. First, a bracket is mounted to the one of the angularly displaceable parts and one end of a helical sleeve is connected to it. Next, a bracket is mounted to another of the angularly displaceable parts and then one end of a shaft is connected to it. The shaft and helical sleeve are sized so that the helical sleeve is at all times at least partially friction fitted to the shaft.

Those skilled in the art will appreciate from the foregoing description that the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A portable computing device comprising:
   a first portion housing a display;
   a second portion; and
   a hinge assembly connected to the first portion and to the second portion to permit pivoting movement of the first portion with respect to the second portion and further comprising:
   a first mounting bracket and a second mounting bracket;
   a helical sleeve having a length, a first end and a second end, the first end being connected to the first mounting bracket and the second end of the helical sleeve having a free end;
   a cylindrical shaft having a diameter and first and second ends and being connected at one of those ends to the second mounting bracket; and
   the helical sleeve having a diameter such that when the helical sleeve is mounted onto the cylindrical shaft, there is an interference force between the sleeve and the cylindrical shaft, the interference force monotonically varying across the length of the sleeve so as to provide a monotonically varying level of tension across the length of the sleeve as the first portion housing the display is pivoted with respect to the second portion, wherein the free end of the helical sleeve is slidingly and frictionally engaged with the cylindrical shaft.

2. The portable computing device of claim 1, wherein the second portion is a kickstand.

3. The portable computing device of claim 1, wherein the portable computing device is a notebook computer.

4. The portable computing device of claim 1, wherein the portable computing device is a tablet computer.

5. The portable computing device of claim 1, wherein the portable computing device is an all-in-one system.

6. A hinge assembly to permit pivoting movement of a first portion of an electronics device with respect to a second portion of the electronics device, comprising:
   a first mounting bracket and a second mounting bracket;
   a helical sleeve having a first end and a second end, the first end being connected to the first mounting bracket and the second end of the helical sleeve having a free end;
   a cylindrical shaft having an outer diameter and first and second ends and being connected at one of those ends to the second mounting bracket; and
   the helical sleeve having a length and an inner diameter such that when the helical sleeve is mounted onto the cylindrical shaft, the outer diameter of the cylindrical shaft and the inner diameter of the helical sleeve produce an interference force between the sleeve and the cylindrical shaft, the interference force monotonically varying across the length of the sleeve so as to provide a monotonically varying level of tension across the length of the sleeve as the first portion housing the display is pivoted with respect to the second portion,
   wherein the free end of the helical sleeve is slidingly and frictionally engaged with the cylindrical shaft.

7. The hinge assembly of claim 6, wherein the helical sleeve comprises at least one loop arranged in a helix.

8. The hinge assembly of claim 7, wherein the helical sleeve comprises a plurality of loops.

9. The hinge assembly of claim 8, wherein the loops of the helical sleeve are sized with respect to the diameter of the cylindrical shaft so that when the cylindrical shaft rotates in a first direction, the loops progressively tighten about the cylindrical shaft resulting in increasing frictional forces with respect to the cylindrical shaft, and when the cylindrical shaft rotates in the opposite direction, the loops progressively loosen about the cylindrical shaft resulting in a lessening of the frictional forces with respect to the cylindrical shaft.

10. The hinge assembly of claim 9, wherein during tightening the loops become progressively tighter towards the first end of the helical sleeve.

11. The hinge assembly of claim 9, wherein during loosening, the loops become progressively looser towards the first end of the helical sleeve.

12. The hinge assembly of claim 6, wherein the hinge presents a first level of torque while being turned in one direction and a second level of torque while being turned in a second direction.

13. The hinge assembly of claim 12, wherein a ratio of the first level of torque to the second level of torque is less than 6:1 and greater than 1:1.

14. The hinge assembly of claim 6, wherein the hinge presents a tightening torque and a loosening torque, and the tightening torque is greater than the loosening torque.

* * * * *